US009992937B2

(12) United States Patent
Tiner

(10) Patent No.: US 9,992,937 B2
(45) Date of Patent: Jun. 12, 2018

(54) PRUNING APPARATUS

(71) Applicant: Dennis A. Tiner, Manor, GA (US)

(72) Inventor: Dennis A. Tiner, Manor, GA (US)

( * ) Notice: Subject to any disclaimer, the term of this patent is extended or adjusted under 35 U.S.C. 154(b) by 294 days.

(21) Appl. No.: 14/833,807

(22) Filed: Aug. 24, 2015

(65) Prior Publication Data
US 2016/0050853 A1 Feb. 25, 2016

Related U.S. Application Data

(60) Provisional application No. 62/040,796, filed on Aug. 22, 2014.

(51) Int. Cl.
*A01G 3/08* (2006.01)
*A01G 3/04* (2006.01)

(52) U.S. Cl.
CPC ............. *A01G 3/08* (2013.01); *A01G 3/0408* (2013.01); *A01G 3/0417* (2013.01); *A01G 3/0426* (2013.01); *A01G 2003/0443* (2013.01)

(58) Field of Classification Search
CPC ...... A01G 3/0426; A01G 3/085; A01G 3/086; A01G 3/088; A01G 3/0408; A01G 2003/0443
USPC .... 53/195, 233, 235, 237; 56/195, 233, 235, 56/237
See application file for complete search history.

(56) References Cited

U.S. PATENT DOCUMENTS

| | | | |
|---|---|---|---|
| 1,602,357 A * | 10/1926 | Georgelis | A01G 3/08 83/486.1 |
| 2,855,008 A * | 10/1958 | Long | A01G 3/08 30/379 |
| 2,926,480 A | 3/1960 | Kimball | |
| 2,940,486 A | 6/1960 | Whitmore | |
| 3,961,468 A | 6/1976 | Brown et al. | |
| 4,174,604 A | 11/1979 | Wilson, Sr. et al. | |
| 4,206,585 A * | 6/1980 | Pollock | A01G 3/0408 56/235 |
| 4,333,266 A | 6/1982 | Babo | |
| 4,970,850 A | 11/1990 | Devries | |
| 5,107,592 A | 4/1992 | Downey et al. | |
| 5,809,765 A * | 9/1998 | Hastings | A01D 34/005 56/255 |
| 5,832,706 A * | 11/1998 | Edwards | A01D 34/866 56/15.2 |
| 6,629,406 B2 | 10/2003 | Tardif | |
| 6,698,176 B2 | 3/2004 | Scott | |
| 7,562,682 B1 | 7/2009 | Torgersen | |

FOREIGN PATENT DOCUMENTS

| | | | | |
|---|---|---|---|---|
| EP | 2206425 A1 * | 7/2010 | | A01G 3/0417 |
| FR | 2654898 A1 * | 5/1991 | | A01G 3/0417 |

* cited by examiner

*Primary Examiner* — Monica L Williams
*Assistant Examiner* — Christopher D Hutchens
(74) *Attorney, Agent, or Firm* — Thomas C. Saitta

(57) ABSTRACT

A bush pruning apparatus adapted for use in combination with a tractor or similar vehicle, wherein the apparatus is mounted to the tractor by a frame that allows the position of the cutting blade relative to the bush be pruned to be freely independent of the position or tilt of the tractor, such that changes in elevation or ground surface encountered by the tractor are not transmitted to the cutting blade to adversely affect the height of the cutting blade.

19 Claims, 2 Drawing Sheets

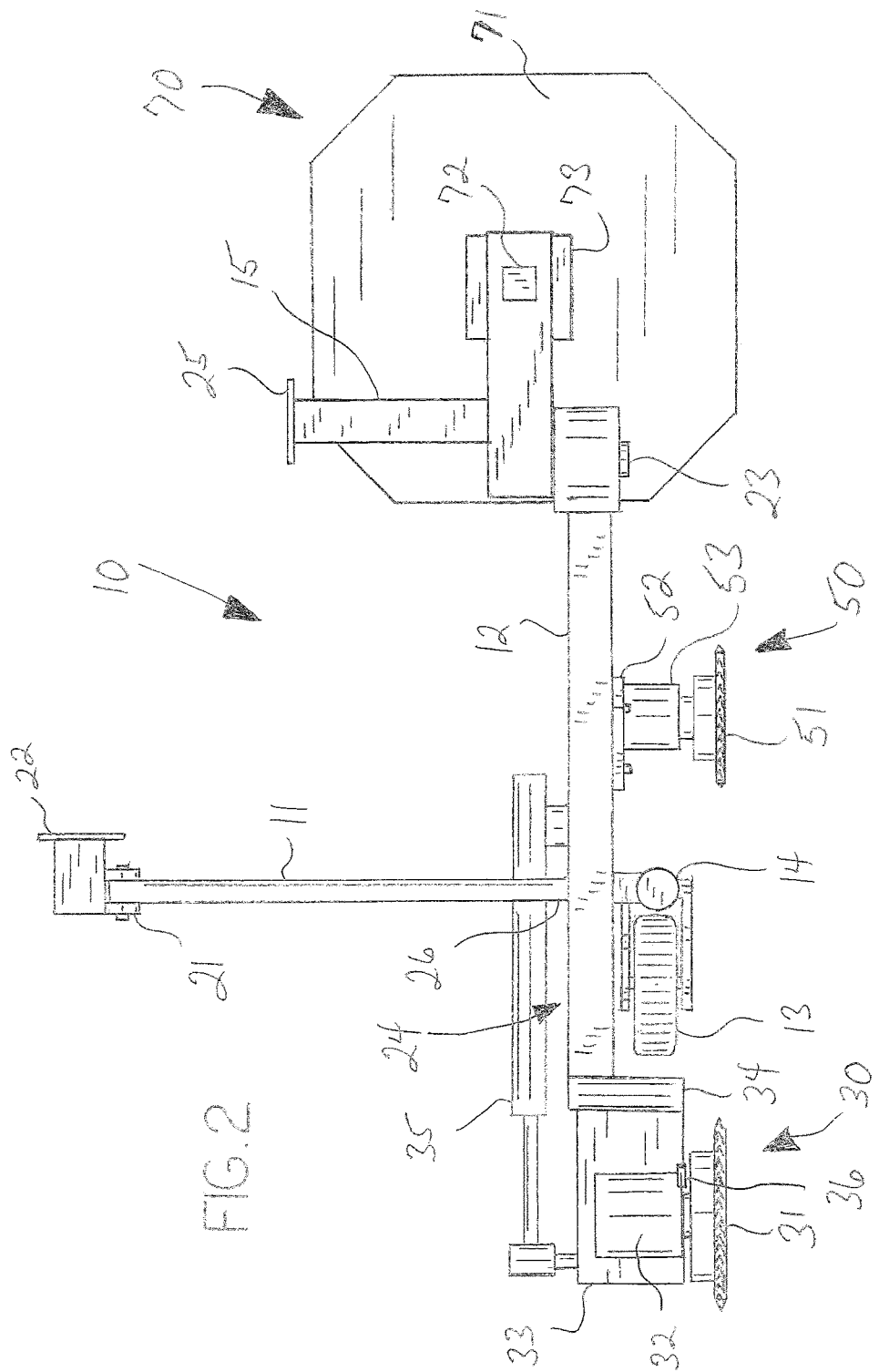

PRUNING APPARATUS

This application claims the benefit of U.S. Provisional Patent Application Ser. No. 62/040,796, filed Aug. 22, 2104, the disclosure of which is incorporated herein by reference.

BACKGROUND OF THE INVENTION

The invention relates to pruning or trimming apparatuses for trees or bushes, and in particular such equipment comprising one or more rotary saw blades. Even more particularly, the invention relates to such equipment adapted to prune or trim the lower branches of bushes or trees, and which are mountable to a tractor or similar powered vehicle.

Fruit bearing plants typically require pruning or trimming to maximize fruit production or to optimize harvesting of the fruit. For example, blueberry bushes having multiple stalks may grow up to seven or eight feet in height and the fruit is often harvested using mechanized shaker equipment. Such harvesting equipment typically incorporates stalk grasping mechanisms having catch pans that are brought together beneath a bush to catch the blueberries that are released when the bush is shaken. It is important to get the catch pans as close as possible to the multiple vertical stalks of the bush in order to minimize product loss. Drooping or low growing lateral branches will sometimes block the catch pans, and therefore it is often necessary to prune the lower branches of the bush to provide unimpeded access for the catch pans.

Pruning the lower branches by hand is a time consuming process for farmers having hundreds or thousands of blueberry bushes. While powered pruners are known, either as stand-alone equipment or as attachments for tractors or the like, the known embodiments suffer certain drawbacks. Equipment that is mounted to a tractor often fails to account for the variation in elevation between the ground level under the row of bushes being trimmed and the tractor pathway, which may be due to ruts, holes or the like in the tractor pathway that create left-right or front-rear tilting of the tractor. If the pruning equipment is mounted in a fixed or rigid manner on the tractor, up and down or side to side tilting movement of the tractor as it moves along the pathway will result in inaccurate trimming. In addition, the known pruning equipment that is adjustable to provide more accurate trimming heights is often complicated and requires the operator to simultaneously drive the tractor and reposition the cutting implements on the move.

It is an object of this invention to provide a powered pruning apparatus that quickly and accurately prunes or trims the lower branches of the bushes and is not adversely affected by variations in ground elevation or surface configuration between the tractor pathway and the ground beneath rows of bushes. Such apparatus is structured as an attachment or accessory mountable to a tractor or similar powered vehicle. It is a further object to provide an embodiment of such an apparatus wherein the height of the pruning blade is adjustable by the tractor operator. It is a further object to provide an embodiment that further comprises a secondary pruning blade that is also height adjustable. It is a further object to provide an embodiment of such an apparatus that further comprises a mulching apparatus that mulches the fallen branches and leaves as the tractor moves along.

SUMMARY OF THE INVENTION

The invention in various embodiments is a bush pruning apparatus adapted for use with a tractor or similar vehicle, wherein the apparatus is mounted to the tractor by an independent suspension frame that allows the position of the cutting or pruning blade relative to the bushes to be freely independent of the position or orientation of the tractor, such that left-right tilting, front-rear tilting or changes in elevation encountered by the tractor are not transmitted to the cutting blade, the height of the blade as the apparatus moves along the row of bushes being responsive to the ground elevation under the row of bushes. The frame may comprise three members, two of the members extending laterally to one side of the tractor, the forward member being mounted in a pivoting manner to the tractor and the rear member being mounted in a fixed manner. The third frame member is pivotally mounted to the rear member and fixedly or pivotally mounted to the forward member, and extends forward substantially parallel to the direction of motion of the tractor. A frame supporting wheel is disposed on the forward portion of the third frame member. The cutting blade is preferably a circular saw blade that is mounted on the forward portion of the third frame member, as is the frame support wheel. The cutting blade is preferably height adjustable, and may be pivotally mounted to the frame to accomplish this. A secondary cutting blade may be positioned on the third frame member to the rear of the primary cutting blade, and is preferably height adjustable. A mulching apparatus positioned to the rear of the cutting blade may be included.

In alternative language, the invention is a pruning apparatus adapted for mounting to a tractor, the apparatus comprising: an independent suspension frame assembly comprising at least one pivot assembly adapted to pivotally mount said frame assembly to the tractor; a pruning assembly mounted to said frame assembly, said pruning assembly comprising a cutting blade; and a ground support wheel mounted to said frame assembly; whereby the height of said cutting blade is determined by said ground support wheel independently of the tractor and whereby said frame assembly precludes transfer of any tilting or up and down movement of the tractor to said pruning assembly during a pruning operation. Furthermore, the apparatus of claim 1, wherein said frame assembly comprises a front frame member, a rear frame member and a main frame member, and wherein said main frame member is pivotally joined to said rear frame member; wherein said cutting blade of said pruning assembly is height adjustable; further comprising a secondary pruning assembly mounted to said frame assembly, said secondary pruning assembly comprising a secondary blade; wherein said cutting blade of said pruning assembly and said secondary cutting blade of said secondary pruning assembly are height adjustable; wherein said cutting blade of said pruning assembly and said secondary cutting blade of said secondary pruning assembly are coplanar; and/or further comprising a mulching assembly mounted to said frame assembly.

In another aspect, the invention is a pruning apparatus adapted for mounting to a tractor, the apparatus comprising an independent suspension frame assembly comprising a front frame member, a rear frame member and a main frame member, wherein said front frame member is adapted to be pivotally mounted to the tractor and joined to said main frame member, and wherein said main frame member is pivotally joined to said rear frame member, and wherein said rear frame member is adapted to be mounted to the tractor; a pruning assembly mounted to said frame assembly, said pruning assembly comprising a height adjustable cutting blade; and a ground support wheel mounted to said frame assembly; whereby said frame assembly precludes transfer of any tilting or up and down movement of the tractor to the pruning assembly during a pruning operation. Furthermore, wherein said pruning assembly further comprises a blade mounting assembly, a blade mount pivoting assembly and an actuator assembly, said blade mounting assembly being joined to said main frame member by said blade mount pivoting assembly, and said actuator assembly being connected to said main frame member and said mounting plate assembly, whereby actuation of said actuating assembly adjusts the height of said cutting blade; further comprising a secondary pruning assembly mounted to said frame assembly, said secondary pruning assembly comprising a height adjustable secondary cutting blade; wherein said secondary pruning assembly further comprises a secondary mounting assembly and wherein said secondary mounting assembly is mounted to said main frame member; wherein said cutting blade of said pruning assembly and said secondary cutting blade of said secondary pruning assembly are coplanar; and/or further comprising a mulching assembly mounted to said frame assembly.

BRIEF DESCRIPTION OF THE DRAWINGS

FIG. 2 shows a top view of the embodiment of FIG. 1.

DETAILED DESCRIPTION OF THE INVENTION

Figure 1:
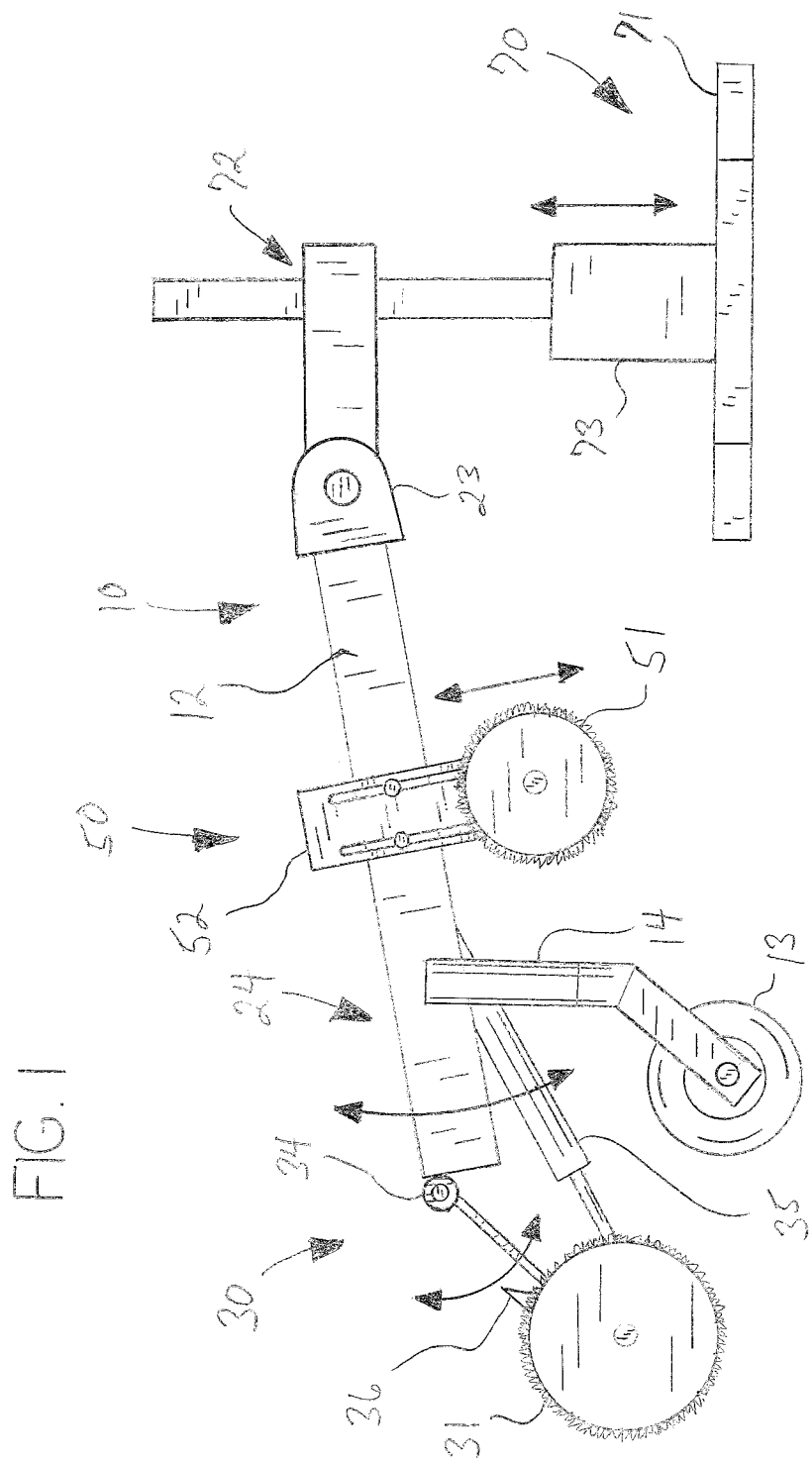
FIG. 1 shows a side view of an embodiment of the invention.

The invention is a pruning or cutting apparatus structured for trimming the lower branches of a plants in the nature of bushes or trees, such as for example blueberry bushes, wherein a saw blade 31 cutting in a generally vertical plane is positioned to undercut, trim or prune the lower branches of the plant so as to properly expose the vertical stalks of the plant for access by grasping, shaking and catch pan harvesting equipment. In an exemplary embodiment, the invention is highly suitable for trimming the lower branches of blueberry bushes in order to optimize the positioning of the harvesting equipment catch pans adjacent the stalks and beneath the bush. The invention may be self-powered and self-propelled, but is preferably structured as an accessory or attachment mountable to and powered by a tractor or similar motorized vehicle. As such, references to the term "tractor" herein shall be taken to include any type of motorized vehicle suitable for the operation.

A representative embodiment is illustrated in FIGS. 1 and 2, and such representation is not meant to be limiting with regard to the scope of the invention as defined in the claims. The pruning apparatus comprises in general an independent suspension frame assembly 10 adapted to be mounted or attached to a tractor so as to extend laterally to one side of the tractor. The term "independent suspension" as used herein defines a frame assembly 10 whose height relative to the ground along the pruning line is independent of the height of the tractor as it moves along its pathway, such that the height of the cutting or pruning blade 31 moves up and down in response to changes in elevation of the ground surface along the pathway of the frame support wheel 13 and is not affected by side to side or up and down tilting movement of the tractor.

In the illustrated embodiment, the frame assembly 10 comprises a rear frame member 15, such as for example a shaft, rod, square-beam, I-beam or the like, that is attached in fixed or rigid manner to the tractor by a mounting assembly 25, such as for example a plate and mechanical fasteners. The frame assembly 10 further comprises a front or transverse frame member 11, such as for example a shaft, rod, square-beam, I-beam or the like, that is pivotally attached to the front or forward portion of the tractor by a mounting assembly 22, such as for example a plate and mechanical fasteners, and a pivot assembly 21, such as for example a bracket and pin, such that the front frame member 11 is able to pivoting or swiveling about the pivot assembly 21 in a substantially vertical motion relative to the front of the tractor. The frame assembly 10 further comprises a main or connecting frame member 12 spaced from the tractor that is pivotally attached to the rear frame member 15 by a pivot assembly 23, such as for example a bracket and pin, such that pivoting or swiveling of the main frame member 12 in a substantially vertical motion is allowed.

The rear frame member 15 and the front frame member 11 each extend laterally from the tractor, i.e., extend perpendicular to the direction of travel of the tractor, and are preferably attached in substantially parallel orientation. The main frame member 12 extends generally perpendicularly to the front frame member 11 and rear frame member 15 so as to be generally aligned and parallel with the direction of travel of the tractor. The outer end 26 of the front frame member 11 is joined to the forward portion 24 of the main frame member 15, in either a fixed or pivoting manner. A ground support wheel 13 is mounted to the frame assembly 10 at or adjacent the junction of the front frame member 11 and the main frame member 15. Preferably the ground support wheel 13 is mounted to the main frame member 15 by a pivoting or swiveling wheel mount assembly 14 such that the wheel 13 is able to pivot or swivel about an upright or vertical axis so as to freely turn to the left or right as needed during forward motion of the pruning apparatus as the tractor is turned.

While the independent suspension frame assembly 10 has been illustrated and described as comprising three frame members 11, 12 and 15 positioned in a generally rectangular configuration, it is to be understood that other combinations of frame members may be utilized. For example, a frame assembly having only two frame members joined at an angle may be utilized, with both frame members being mounted to the tractor in pivoting manner.

The pruning assembly 30 is preferably positioned on the forward portion 24 of the main frame member 15 as shown in the drawings, or alternatively the pruning assembly may be mounted onto the front frame member 11. The pruning assembly 30 may comprise any system that allows the pruning blade 31 to be raised or lowered as needed. Most preferably the blade or cutting member 31 is a circular saw blade. The circular saw blade 31 and a saw motor 32 are mounted to the frame assembly 10 at a location higher than the wheel 13, preferably extending to the front of the main frame member 12, the blade member 31 being substantially vertically oriented so as to cut in a vertical plane along the direction of travel. The motor 32 may be hydraulically, electrically or fuel powered through appropriate connections to the hydraulic, electrical or fuel systems of the tractor, or separate power sources dedicated to the motor 32 may be provided. The cutting height of the blade 31 may be adjusted in various ways, such as by changing the blade diameter, providing a vertically adjustable mount for the blade 31 relative to the frame assembly 10, or by providing a vertically adjustable mount for the wheel 13 relative to the frame assembly 10. A preferred embodiment for adjusting the cutting height of the blade 31 is shown in the figures, wherein the circular blade member 31 and motor 32 are mounted onto a blade mounting assembly 33, the mounting assembly 33 being joined to the main frame member 15 by a blade mount pivoting assembly 34, such that the blade 31 may be raised or lowered by pivoting the blade mounting assembly 33 up or down. A preferred structure further comprises the provision of a hydraulic or otherwise powered actuating assembly 35, which is shown for example as a hydraulic cylinder connected to the blade mounting assembly 33. This structure allows the tractor operator to raise and lower the blade 31 as desired to change between a high neutral and the operational position to set it at the desired height for pruning, or to adjust the height if needed during the pruning operation.

One or two forward extending brush arms (not shown) may be mounted to extend forward of the blade 31 to direct the branches into the cutting area of the blade 31, the brush arms preferably being an upper brush arm and a lower brush arm. Additionally, a blade shear member 36 may be mounted adjacent the blade 31 for more efficient cutting.

With this structure the blade 31 is not adversely influenced by left-right tilting, front-rear tilting or elevation changes of the tractor as the tractor moves along beside the row of bushes, such that the proper pruning height is maintained regardless of orientation changes of the tractor due to ruts, holes, elevation changes, etc. As the tractor moves along the pathway, the ground support wheel 13 moves along the plant row beneath the bushes. The wheel 13 supports the pruning blade 31 at the proper height to trim the lower branches of each bush, since the cutting height of the blade 31 during use is determined by the ground elevation at the base of the bush independently of the relative position or orientation of the tractor. Because the main frame member 15 and the front frame member 11 are pivotally attached to the rear frame member 15 and the tractor, respectively, any change in elevation or tilt of the tractor is not transmitted to the cutting blade 31 to alter the pruning height.

In a more preferred embodiment of the pruning apparatus, a secondary pruning assembly 50 is mounted to the main frame member 15 to the rear of the main pruning assembly 30. The secondary pruning assembly 50 comprises a secondary cutting or pruning blade 51, preferably a circular blade, a secondary motor 53 of the operating type matching the main motor 32, and a height adjustable mounting assembly 52, such as for example a slotted plate with mechanical fasteners. The secondary cutting blade 51 is aligned substantially parallel with the main cutting blade 31 and preferably in both blades 31 and 51 occupy the same plane. With this structure the vertical cutting range of the pruning apparatus 10 may be increased by setting the position of the secondary blade 51 at a height greater than the position of the main blade 31. In the embodiment shown in the drawings adjustment of the secondary blade 51 is made manually, but it is also possible to provide hydraulic or otherwise powered systems to alter the height of the secondary blade 51.

In an additional embodiment a mulching assembly 70, such as a mower deck or guard 71 having a motor 73 and a centrally mounted rotary blade of known type, is attached or suspended from the frame assembly 10, the mulching assembly 70 being positioned to the rear of the cutting blade 31 so as to mulch the branches that have fallen to the ground after they are trimmed away from the bushes. The mulching assembly 70 is preferably mounted to the frame assembly 10 by a height adjustable mounting assembly 72. The mulching motor 73 is preferably matched to the type of motor 32 utilized to power the blade 31.

Hydraulic lines, electrical lines or the like for powering the various motors or actuating devices are not illustrated for the sake of clarity, such being well known in the art. For hydraulic systems, a storage tank and pump for hydraulic fluid may also be present.

It is understood and contemplated that substitutions and equivalents for certain elements set forth above may be obvious to those of skill in the art, and therefore the true scope and definition of the invention is to be as set forth in the following claims.

I claim:

1. A pruning apparatus adapted for mounting to a tractor, wherein the tractor defines a direction of travel, the apparatus comprising:
    an independent suspension frame assembly comprising a front frame member, a rear frame member and a main frame member, wherein said front frame member is adapted to be pivotally mounted to the tractor and joined to said main frame member, and wherein the rearward portion of said main frame member is pivotally joined by a pivot assembly to said rear frame member such that the forward portion of said main frame member moves in a vertical arc centered on said main frame member pivot assembly, said pivot assembly having an axis of rotation perpendicular to the direction of travel, and wherein said rear frame member is adapted to be rigidly mounted to the tractor;
    a pruning assembly mounted to said frame assembly, said pruning assembly comprising a height adjustable cutting blade; and
    a ground support wheel mounted to said frame assembly;
    whereby said front frame member and said main frame member move independently of the tractor and said rear frame member, such that said frame assembly precludes transfer of any tilting or up and down movement of the tractor to the pruning assembly during a pruning operation and such that movement of said pruning assembly is maintained within a substantially vertical plane.

2. The apparatus of claim 1, wherein said pruning assembly further comprises a blade mounting assembly, a blade mount pivoting assembly and an actuator assembly, said blade mounting assembly being joined to said main frame member by said blade mount pivoting assembly, and said actuator assembly being connected to said main frame member and said blade mounting assembly, whereby actuation of said actuating assembly adjusts the height of said cutting blade.

3. The apparatus of claim 1, further comprising a secondary pruning assembly mounted to said frame assembly, said secondary pruning assembly comprising a height adjustable secondary cutting blade.

4. The apparatus of claim 2, further comprising a secondary pruning assembly mounted to said frame assembly, said secondary pruning assembly comprising a height adjustable secondary cutting blade.

5. The apparatus of claim 3, wherein said secondary pruning assembly further comprises a secondary mounting assembly and wherein said secondary mounting assembly is mounted to said main frame member.

6. The apparatus of claim 4, wherein said secondary pruning assembly further comprises a secondary mounting assembly and wherein said secondary mounting assembly is mounted to said main frame member.

7. The apparatus of claim 3, wherein said cutting blade of said pruning assembly and said secondary cutting blade of said secondary pruning assembly are coplanar.

8. The apparatus of claim 1, further comprising a mulching assembly mounted to said frame assembly.

9. The apparatus of claim 3, further comprising a mulching assembly mounted to said frame assembly.

10. The apparatus of claim 6, further comprising a mulching assembly mounted to said frame assembly.

11. The apparatus of claim 1, wherein the tractor defines a direction of travel, and wherein said main frame member is adapted to be mounted parallel to the direction of travel.

12. The apparatus of claim 1, wherein the tractor defines a direction of travel, and wherein both said front frame member and said rear frame member are adapted to be mounted to the tractor perpendicularly to the direction of travel, and wherein said main frame member is mounted perpendicularly to said front frame member and said rear frame member.

13. The apparatus of claim 1, wherein said front frame member is pivotally joined to said main frame member.

14. The apparatus of claim 11, wherein said front frame member is pivotally joined to said main frame member.

15. The apparatus of claim 13, wherein said front frame member is pivotally joined to said main frame member.

16. A pruning apparatus adapted for mounting to a tractor, wherein the tractor defines a direction of travel, the apparatus comprising:
    an independent suspension frame assembly comprising a front frame member, a rear frame member and a main frame member, wherein said front frame member is adapted to be pivotally mounted to the tractor and joined to said main frame member, and wherein the rearward portion of said main frame member is pivotally joined by a pivot assembly to said rear frame member such that the forward portion of said main frame member moves in a vertical arc centered on said main frame member pivot assembly, said pivot assembly having an axis of rotation perpendicular to the direction of travel, and wherein said main frame member is adapted to be mounted parallel to the direction of travel, and wherein said rear frame member is adapted to be rigidly mounted to the tractor;
    a pruning assembly mounted to said frame assembly, said pruning assembly comprising a height adjustable cutting blade;
    and a ground support wheel mounted to said frame assembly;
    whereby said front frame member and said main frame member move independently of the tractor and said rear frame member, such that said frame assembly precludes transfer of any tilting or up and down movement of the tractor to the pruning assembly during a pruning operation and such that movement of said pruning assembly is maintained within a substantially vertical plane.

17. The apparatus of claim 16, wherein both said front frame member and said rear frame member are adapted to be mounted to the tractor perpendicularly to the direction of travel, and wherein said main frame member is mounted perpendicularly to said front frame member and said rear frame member.

18. The apparatus of claim 16, wherein said front frame member is pivotally joined to said main frame member.

19. The apparatus of claim 17, wherein said front frame member is pivotally joined to said main frame member.

* * * * *